(12) United States Patent
Dalfra

(10) Patent No.: US 12,045,647 B2
(45) Date of Patent: Jul. 23, 2024

(54) AUTOMATIC WORKING SYSTEM, FORWARDING DEVICE, AND TASK EXECUTION DEVICE

(71) Applicant: Positec Power Tools (Suzhou) Co., Ltd, Jiangsu (CN)

(72) Inventor: Davide Dalfra, Vicenza (IT)

(73) Assignee: Positec Power Tools (Suzhou) Co., Ltd., Suzhou (CN)

( * ) Notice: Subject to any disclaimer, the term of this patent is extended or adjusted under 35 U.S.C. 154(b) by 647 days.

(21) Appl. No.: 17/057,303

(22) PCT Filed: May 22, 2019

(86) PCT No.: PCT/CN2019/088018
§ 371 (c)(1),
(2) Date: Nov. 20, 2020

(87) PCT Pub. No.: WO2019/223735
PCT Pub. Date: Nov. 28, 2019

(65) Prior Publication Data
US 2021/0191764 A1    Jun. 24, 2021

(30) Foreign Application Priority Data

May 22, 2018   (CN) .......................... 201810496403.8

(51) Int. Cl.
*G06F 9/48* (2006.01)
*G06F 9/38* (2018.01)
*H04W 84/02* (2009.01)

(52) U.S. Cl.
CPC .......... *G06F 9/4881* (2013.01); *G06F 9/3836* (2013.01); *H04W 84/02* (2013.01)

(58) Field of Classification Search
None
See application file for complete search history.

(56) References Cited

U.S. PATENT DOCUMENTS 9,237,689 B2 *   1/2016   Choi .................... A01D 34/008
9,395,723 B2 *   7/2016   Pari ....................... G05D 1/0022
(Continued)

FOREIGN PATENT DOCUMENTS

CN        102883340 A       1/2013
CN        105163089         12/2015
(Continued)

OTHER PUBLICATIONS

Examination Report of EP Patent Application No. 19808477.4, dated Aug. 4, 2023.
(Continued)

*Primary Examiner* — Van H Nguyen
(74) *Attorney, Agent, or Firm* — Lee & Hayes, P.C.

(57) ABSTRACT

A disclosed automatic working system includes at least one task execution device and at least one forwarding device. The forwarding device communicates with the task execution device to manage the running of the task execution device and/or acquire status information of the task execution device and/or a working region. The forwarding device may be connected to a remote data processing center to acquire control information and manage the running of the task execution device. The forwarding device may also be configured to output status information received from the task execution device and/or the working region to the remote data processing center.

20 Claims, 6 Drawing Sheets

(56) References Cited

U.S. PATENT DOCUMENTS

| | | | |
|---|---|---|---|
| 10,791,684 B2* | 10/2020 | He | A01G 25/167 |
| 10,852,735 B2* | 12/2020 | Tan | G05D 1/0265 |
| 11,020,860 B2* | 6/2021 | Cheuvront | G06F 16/00 |
| 2011/0111700 A1* | 5/2011 | Hackett | H04W 72/23 |
| | | | 455/41.2 |
| 2013/0192183 A1 | 8/2013 | Choi et al. | |
| 2015/0094879 A1 | 4/2015 | Pari et al. | |
| 2017/0192402 A1* | 7/2017 | Karp | G06F 9/541 |
| 2017/0251060 A1 | 8/2017 | Larsén et al. | |
| 2017/0361468 A1 | 12/2017 | Cheuvront et al. | |

FOREIGN PATENT DOCUMENTS

| | | |
|---|---|---|
| CN | 105163089 A | 12/2015 |
| CN | 105163090 A | 12/2015 |
| CN | 107346126 | 11/2017 |
| CN | 107346126 A | 11/2017 |
| CN | 105163090 A | 9/2018 |
| WO | 2009/135312 A1 | 11/2009 |
| WO | 2009135312 | 11/2009 |

OTHER PUBLICATIONS

English Translation of Chinese Office Action and Search Report for Chinese Application No. CN201980005080 dated Jun. 29, 2021, 18 pages.

English Translation of PCT Search Report and Written Opinion for corresponding PCT application No. PCT/CN2019/088018 dated Jul. 31, 2019, 6 pages.

Extended European Search Report of the Appl'n No. 19808477.4 dated Jan. 27, 2022.

* cited by examiner

AUTOMATIC WORKING SYSTEM, FORWARDING DEVICE, AND TASK EXECUTION DEVICE

This application is a National Stage Application of International Application No. PCT/CN2019/088018, filed on May 22, 2019, which claims benefit of and priority to Chinese Patent Application No. 201810496403.8, filed on May 22, 2018, all of which are hereby incorporated by reference in their entirety for all purposes as if fully set forth herein.

BACKGROUND

Technical Field

The present invention relates to an automatic working system, and in particular, to an automatic working system that can automatically control a task execution device to work in a working region.

The present invention relates to a forwarding device, and in particular, to a forwarding device that can manage a task execution device in a working region.

The present invention relates to a task execution device, and in particular, to a task execution device that can perform a task in a working region.

Related Art

With the development of science and technology, people are already familiar with intelligent yard management systems. An intelligent yard management system can monitor and manage task execution devices and sensor devices in a yard for a user to acquire a status of the yard and further manage the yard, for example, maintain a lawn. However, a yard has a complex environment and involves various types of work. For example, different plants in a yard require different conditions for growth and maintenance.

SUMMARY

The technical problem to be resolved by the embodiments of present invention is to provide an automatic working system, a forwarding device, and a task execution device that can work efficiently and stably.

To resolve the foregoing technical problems, embodiments of the present invention provide an automatic working system, comprising at least one task execution device and at least one forwarding device, the forwarding device communicates with the task execution device to manage the running of the task execution device and/or acquire status information of the task execution device and/or a working region, the task execution device comprises a first communications module, the forwarding device comprises a second communications module, and the first communications module and the second communications module establish a communication connection to implement communication between the task execution device and the forwarding device; the first communications module and the second communications module are RF communications modules that operate in a frequency band below 1 GHz; the forwarding device comprises a third communications module, and is connected to a remote data processing center through the third communications module; the forwarding device acquires control information from the remote data processing center, and manages the running of the task execution device based on the control information; and/or, the forwarding device outputs the status information of the task execution device and/or the working region to the remote data processing center.

In a specific embodiment, the control information acquired by the forwarding device from the remote data processing center is at least partially generated by processing input information by the remote data processing center; and the input information comprises at least one piece of the status information output by the forwarding device, information input by a user or information automatically acquired by the remote data processing center from the internet.

In a specific embodiment, the third communications module establishes a communication connection with a router, and connects to the internet through the router, so as to be connected to the remote data processing center.

In a specific embodiment, the third communications module directly connects to the internet, so as to be connected to the remote data processing center.

In a specific embodiment, the forwarding device is connected to the remote data processing center to acquire an instruction from an user's intelligent terminal and/or output the status information of the task execution device and/or the working region to the user's intelligent terminal.

In a specific embodiment, the automatic working system comprises at least two task execution devices, the forwarding device communicates with the at least two task execution devices.

In a specific embodiment, the task execution device comprises a first frequency band switching module, the forwarding device comprises a second frequency band switching module, the first frequency band switching module controls the first communications module to automatically switch between a plurality of frequency bands, and the second frequency band switching module controls the second communications module to automatically switch between a plurality of frequency bands, to enable the first communications module and the second communications module to switch to the same frequency band.

In a specific embodiment, the forwarding device communicates with one task execution device at one time.

In a specific embodiment, the forwarding device sequentially communicates with different task execution devices.

In a specific embodiment, the frequency band of the RF communications module includes a frequency band of 433 MHz, 868 MHz or 915 MHz.

In a specific embodiment, the automatic working system comprises a sensor device is configured to detect the status information of the task execution device or the working region, and the forwarding device collects the status information detected by the sensor device.

In a specific embodiment, the sensor device comprises a fourth communications module, the fourth communications module establishes a communication connection with the second communications module of the forwarding device to implement communication between the sensor device and the forwarding device, and the fourth communications module is an RF communications module that operate in a frequency band below 1 GHz.

In a specific embodiment, the sensor device is integrated on the task execution device or the sensor device is placed in the working region.

In a specific embodiment, the forwarding device is placed in a building.

In a specific embodiment, the management of the running of the task execution device by the forwarding device comprises: controlling the task execution device to start or end work, and/or controlling parameters of the running of the task execution device, and/or controlling a working path of the task execution device.

In a specific embodiment, the task execution device comprises a self-moving device, and is, for example, at least one of an intelligent lawn mower, an intelligent sprinkler, an intelligent snowplow, an intelligent cultivator or a cleaning robot.

In a specific embodiment, the automatic working system comprises at least two task execution devices, and the task execution devices can communicate with each other through the first communications module.

The embodiments of the present invention further provide a forwarding device, the forwarding device being configured to communicate with at least one task execution device to manage the running of the task execution device and/or acquire status information of the task execution device and/or a working region, the forwarding device comprises a second communications module, and communicates the task execution device comprising a first communications module through the second communications module; the second communications module of the forwarding device is an RF communications module that operates in a frequency band below 1 GHz; the forwarding device comprises a third communications module, and is connected to a remote data processing center through the third communications module; the forwarding device acquires control information from the remote data processing center, and manages the running of the task execution device based on the control information; and/or, the forwarding device outputs the status information of the task execution device and/or the working region to the remote data processing center.

In a specific embodiment, the forwarding device is configured to communicate with at least two task execution devices to manage the running of the at least two task execution devices and/or acquire the status information of the at least two task execution devices and/or the working region.

In a specific embodiment, the forwarding device comprises a second frequency band switching module, and the second frequency band switching module controls the second communications module to automatically switch between a plurality of frequency bands, to enable the second communications module and the first communications module to switch to the same frequency band.

The embodiments of the present invention further provide a task execution device, the task execution device performing a task in a working region, the task execution device comprises a first communications module, communicates with a forwarding device comprising a second communications module by using the first communications module, receives control information from the forwarding device, and/or, transmits status information of the task execution device and/or the working region to the forwarding device; the control information received by the task execution device is at least partially acquired by the forwarding device from a remote data processing center; and the first communications module is an RF communications module that operates in a frequency band below 1 GHz.

The beneficial effects of the embodiments of present invention are as follows: The automatic working system provided in the embodiments of present invention uses the remote data processing center to monitor the status information of the task execution device and/or the working region, and the remote data processing center can further generate control information to stably and efficiently manage the running of the task execution device. Moreover, the task execution device and the forwarding device in the automatic working system communicate with each other through radio frequency (RF) communications modules that operate in a frequency band below 1 GHz. It is simple and fast to establish a communication connection between devices, and communication is more stable and reliable. In addition, the forwarding device provided in the embodiments of present invention has advantages such as a small volume, low costs, low power consumption, high sensitivity, a long transmission distance, and high efficiency.

BRIEF DESCRIPTION OF THE DRAWINGS

The technical problems resolved by the present invention, the technical solutions, and the beneficial effects discussed above can be clearly obtained by using the following detailed description that can be used to implement the preferred specific embodiments of the present invention with reference to the description of the accompanying drawings.

The same numerals and symbols in the accompanying drawings and specification are used to represent the same or equivalent elements.

DETAILED DESCRIPTION

The detailed description and technical content of the embodiments of present invention are described below with reference to the accompanying drawings. However, the accompanying drawings are only used for reference and description, but are not intended to limit the embodiments of present invention.

Figure 1:
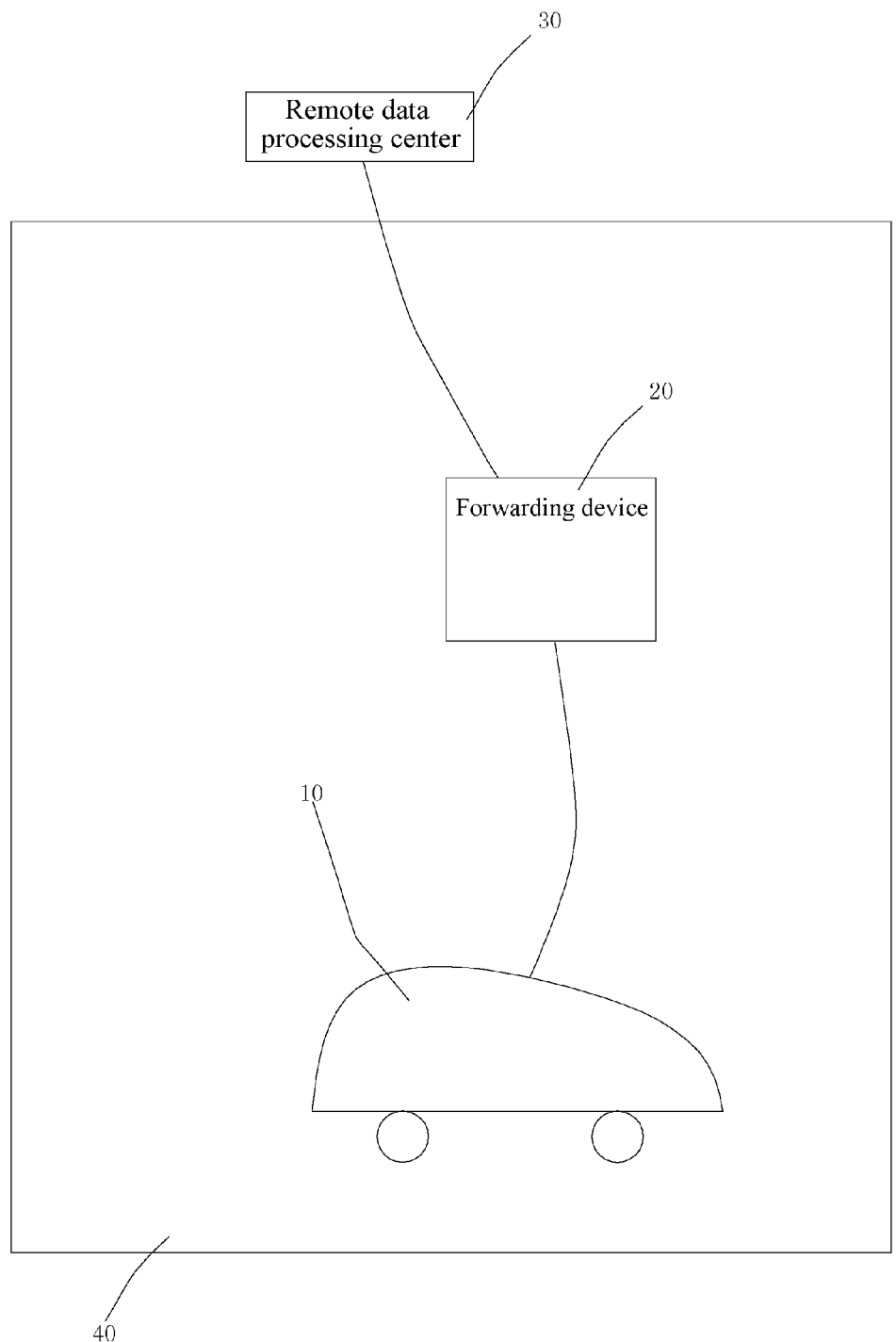
FIG. 1 is a schematic diagram of an automatic working system according to an embodiment of the present invention.

FIG. 1 shows an automatic working system. The automatic working system is, for example, an intelligent management system, and can automatically monitor and manage the work of a task execution device in a working region. The automatic working system includes at least one task execution device 10 and at least one forwarding device 20. The forwarding device 20 communicates with the task execution device 10 to manage the running of the task execution device 10 and acquires status information of the task execution device 10 and a working region 40. The forwarding device 20 further communicates with a remote data processing center 30, outputs the status information of the task execution device 10 and the working region 40 to the remote data processing center 30, and can further acquire control information from the remote data processing center 30 and manage the running of the task execution device 10 based on the control information.

Figure 2:
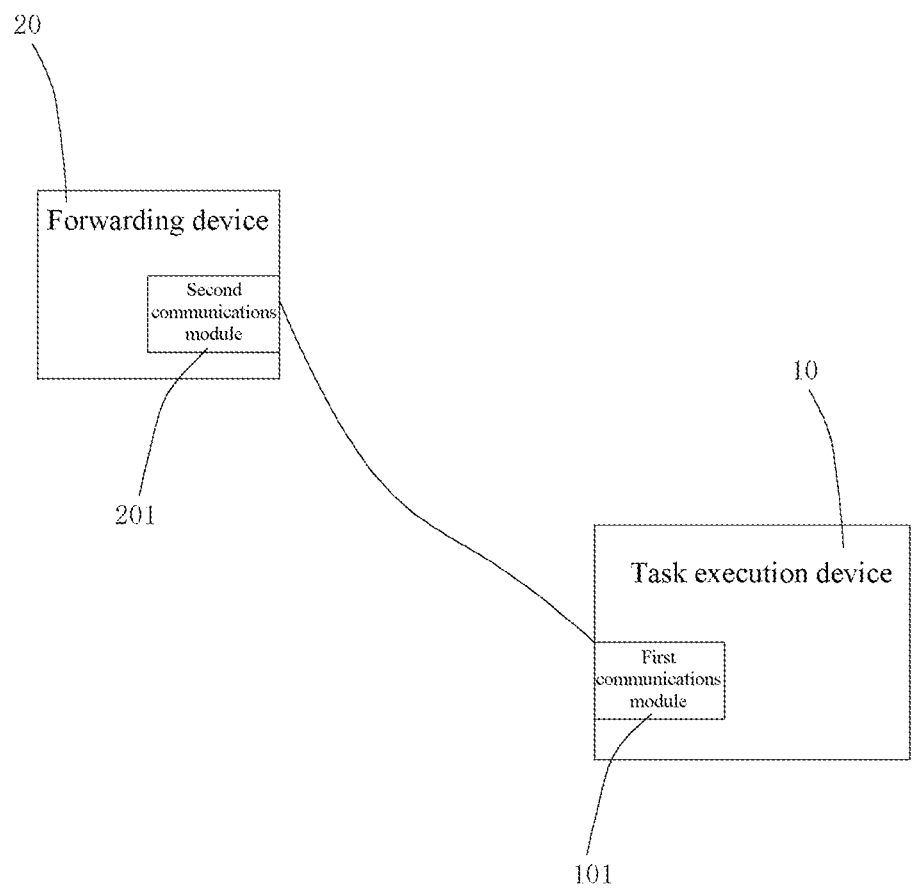
FIG. 2 is a schematic diagram showing that a forwarding device and a task execution device are connected according to an embodiment of the present invention.

As shown in FIG. 2, the task execution device 10 includes a first communications module 101. The forwarding device 20 includes a second communications module 201. The first communications module 101 and the second communications module 201 establish a communication connection to implement communication between the task execution device 10 and the forwarding device 20. The first communications module 101 and the second communications module 201 are RF communications modules that operate in a frequency band below 1 GHz.

The RF communications module in this embodiment can cover any common frequency range whose frequency band is below 1 GHz. In a specific embodiment, the frequency band of the RF communications module includes a frequency band of 433 MHz, 868 MHz or 915 MHz. In an embodiment, an RF frequency band is a public frequency band. The transmission is free of charge and is stable and reliable, so that the forwarding device 20 and the task execution device 10 can be reliably connected to ensure long-distance transmission between the forwarding device and the task execution device.

The public frequency band is a public frequency band that is an ISM frequency band and meets a communication protocol between task execution devices in the working region 40. The public frequency band in this embodiment is 433 MHz, 868 MHz, 915 MHz or the like. The frequency band has a simple communication protocol, so that the task execution device transmits data more reliably.

In a specific embodiment, the task execution device includes a first frequency band switching module, the forwarding device includes a second frequency band switching module, and the two frequency band switching modules can control the RF communications module to automatically switch between a plurality of frequency bands. For example, when the RF communications modules of the task execution device and the forwarding device choose the frequency band of 868 MHz for communication, specifically, choose a sub-frequency band of 869.400 MHz to 869.650 MHz for communication. If the frequency band has a congested channel to cause poor signal quality or a signal loss, the first frequency band switching module and the second frequency band switching module may automatically switch the first communications module 101 and the second communications module 201 to another sub-frequency band in a frequency band of 868 MHz for communication, for example, to a frequency band of 868.000 MHz to 868.600 MHz, thereby resolving the problems of excessive interference, poor signal quality, and short transmission distances caused by congested channels are resolved. A frequency band switching rule of the first frequency band switching module and the second frequency band switching module may be not limited. That is, which party triggers switching of the frequency bands of the first communications module of the task execution device and the second communications module of the forwarding device is not limited. For example, a principle of first switching the frequency band of one of the task execution device and the forwarding device may be defined. For example, it is predefined that the second frequency band switching module of the forwarding device switches the frequency band first. In this case, when the first communications module of the task execution device or the second communications module of the forwarding device cannot receive data or receive data with poor signal quality within a time, it is eventually determined through comprehensive analysis that when a channel is congested, the second frequency band switching module of the forwarding device first switches the second communications module to another frequency band, and then instructs the first communications module of the task execution device to switch to the corresponding frequency band. After the first communications module receives the instruction, the first frequency band switching module switches the first communications module to the corresponding frequency band. Alternatively, the task execution device detects that the second communications module of the forwarding device has been switched to another frequency band. In this case, the first frequency band switching module of the task execution device automatically switches the first communications module to the corresponding frequency band. In another case, a principle of switching first the party that transmits data or the party that receives data may be defined. If it is defined that the frequency band of the party that transmits data is switched first. For example, the forwarding device transmits data to the task execution device. If detecting that within a time the forwarding device cannot successfully transmit several data packets, the forwarding device eventually determines through comprehensive analysis that a channel is congested. In this case, the forwarding device that transmits data by using the second frequency band switching module to first switch the frequency band of the second communications module, and the first frequency band switching module of the task execution device then switches the first communications module to the corresponding frequency band.

In conclusion, the RF communications modules of the forwarding device and the task execution device in this embodiment have a frequency hopping function and can switch between a plurality of frequency bands. The two RF communications modules are correspondingly switched to the same frequency band for communication to resolve the problems such as signal congestion, thereby effectively expanding a link range and greatly improving performance.

In a specific embodiment, the task execution device performs a specific task in the working region. The working region may be a yard or a building, for example, a user's yard, home or the like. The task execution device may be any device such as a self-moving device or a non-self-moving device that can be controlled to perform a specific task. When the working region is a yard, the task execution device is at least one of an intelligent lawn mower, an intelligent sprinkler, an intelligent snowplow or an intelligent cultivator or includes an irrigation system that is fixedly disposed in a yard. The task execution device performs a task such as cultivation, sprinkling, lawn mowing, snowplowing and irrigation in the yard. When the working region is a user's home, the task execution device may be a device such as a cleaning robot, a door, a window or a lamp in the home, and performs a task of removing dust and garbage, opening/closing the door or window, turning on/off the lamp, adjusting the brightness or color of the lamp, among other tasks. In a specific embodiment, the working region may include both a user's home and yard. The automatic working system can jointly monitor and manage the running of all controlled task execution devices in the user's home. It may be understood that a sensor device configured to detect a status information of the task execution device and the working region is further included in the working region. The forwarding device collects the status information of the task execution device and the working region that is detected by the sensor device and transmits the status information to the remote data processing center 30. Furthermore, the remote data processing center processes the status information to generate control information. The forwarding device manages the running of the task execution device based on the control information. It may be understood that the quantity of sensor devices is not limited, and the quantity of sensors may be set according to a region type of the working region.

In a specific embodiment, for example, the working region is a yard, and the task execution device is an intelligent lawn mower. The sensor device is disposed at one or more positions of the yard and may be used to detect a growth status of plants in a yard. For example, the sensor device detects the height, humidity/moisture status or the like of a lawn. When the sensor device is integrated on the intelligent lawn mower, the sensor device can further detect a status of the lawn mower. For example, the sensor device detects load information of a cutting disk of the lawn mower to represent a status of the lawn or may detect fault information or the like of the intelligent lawn mower. The sensor device transmits the detected status information to the forwarding device. The forwarding device transmits the status information to the remote data processing center. It may be understood that the forwarding device includes a third communications module 202 and connects to the internet through the third communications module to communicate with the remote data processing center. The third communications module may directly connect to the internet or may be connected to a gateway device such as a router to connect to the internet. In a specific embodiment, the sensor device detects the height data and humidity data of grass on a lawn and transmits the height data and humidity data of the grass to the forwarding device. The forwarding device then transmits the height data and humidity data of the grass to the remote data processing center. The remote data processing center stores a preset condition or a preset algorithm. The remote data processing center compares the height data and humidity data with the preset condition. When the height of the grass exceeds a preset condition, for example, when the detected height of the grass exceeds a preset height of 30 cm, the remote data processing center performs computation by combining the height data, the humidity data, and the preset condition, and generates corresponding control information after the computation to control the intelligent lawn mower to perform lawn mowing work. Specifically, for example, the intelligent lawn mower is controlled to start or end work, and/or parameters of the running of the task execution device are controlled, and/or a working path or the like of the intelligent lawn mower is controlled. The preset condition is, for example, a parameter preset by a user. For example, the user sets that when the height of grass in a yard is greater than 30 cm, an intelligent lawn mower needs to be controlled to cut grass.

The data computation in this embodiment of the present invention is processed at the remote data processing center. The remote data processing center has a large data capacity and can process a massive amount of data. That is, complex data transmitted by an automatic working system that has a large quantity of task execution devices and sensor devices can be stably processed, and the remote data processing center has high extensibility. When there are more task execution devices and sensor devices in the automatic working system or the task execution devices and sensor devices become more complex, the remote data processing center can still be effectively processed. In addition, the remote data processing center has a strong computing capability, so that the complex data transmitted by the automatic working system is processed at a high computation speed without reduced errors. In addition, when a data computation process is completed at the remote data processing center, the forwarding device can have lower performance and lower costs. In conclusion, the intelligent management system in this embodiment of the present invention uses the solution of processing data computation completely at the remote data processing center, and the intelligent management system can run efficiently and stably.

In another specific embodiment, the forwarding device is connected to the remote data processing center to acquire an instruction input by a user on an intelligent terminal, and may further output the status information of the task execution device and the working region to the user's intelligent terminal. Specifically, after the remote data processing center acquires the status information of the working region and/or an intelligent lawn mower transmitted by the forwarding device, the status information can be displayed on the intelligent terminal of the user. After viewing the status information, the user may input instruction information as required on the intelligent terminal to control the running of an intelligent lawn mower. It may be understood that if the user does not acquire the status information or if the status information does not satisfy a preset condition, the user may alternatively directly input an instruction to control the running of an intelligent lawn mower. In this embodiment, the user can control the running of the task execution device as required and set related parameters of running or perform other operations, so that the manner is more flexible and convenient.

In other embodiments, the remote data processing center can further automatically acquire information from the internet for processing to generate control information to control the running of an intelligent lawn mower. For example, the remote data processing center obtains weather information from the internet. The weather information shows that it will rain after a preset time. At this time, the remote data processing center acquires that an intelligent lawn mower is working in a yard. In this case, the remote data processing center can combine the acquired weather information and working status information of the intelligent lawn mower to generate an instruction and control the intelligent lawn mower to return to a charging station and stop working. In this way, the intelligent lawn mower is prevented from working in rain, in which case both the intelligent lawn mower and the lawn may suffer damage.

In another specific embodiment, for example, the working region is a user's home, and the task execution device is a cleaning robot. Sensor devices are also disposed at one or more places in the user's home. For example, a sensor device monitors a dust or garbage status on the floor. When sensor devices are integrated on the cleaning robot, a status of the cleaning robot, a status of a roller brush, and a status of a dust container can further be monitored to represent a status of the floor. Similarly, fault information of the cleaning robot may be detected. The sensor devices transmit the detected dust or garbage status and the status information of the cleaning robot to the forwarding device. The forwarding device transmits the status information to the remote data processing center. The remote data processing center stores a preset condition or stores a preset algorithm. The remote data processing center processes the status information to generate control information. The forwarding device acquires the control information from the remote data processing center, and manages the running of a cleaning robot based on the control information.

In other embodiments, when the task execution device is a door or window, sensor devices detect weather information that affects the opening/closing state of the door or window and detect status information about whether the door or window is opened or closed. The weather information indicates, for example, a sunny day, rain, snow, wind or a sandstorm. For example, when the sensor device detects that it is raining outside or it is about to rain but the window is open, the remote data processing center performs processing to generate a related instruction. The forwarding device transmits the instruction to control the window to be closed or control the window to be closed after a predetermined time. When it is detected that the weather is clearing up, an instruction is generated to control the window to be opened.

In other embodiments, when the task execution device is a lamp, sensor devices detect brightness information in a room and status information of the lamp and transmit the brightness information and the status information to the remote data processing center by using the forwarding device. The remote data processing center generates an instruction according to the status information and uses the forwarding device to perform a task of controlling the lamp to be opened/closed, adjusting the brightness or color of the lamp, among other tasks.

It may be understood that in all the embodiments described above, the remote data processing center can process information input by a user on the intelligent terminal or information obtained from the internet to generate control information to control the running of a task execution device such as a cleaning robot, a door, a window or a lamp.

Figure 3:
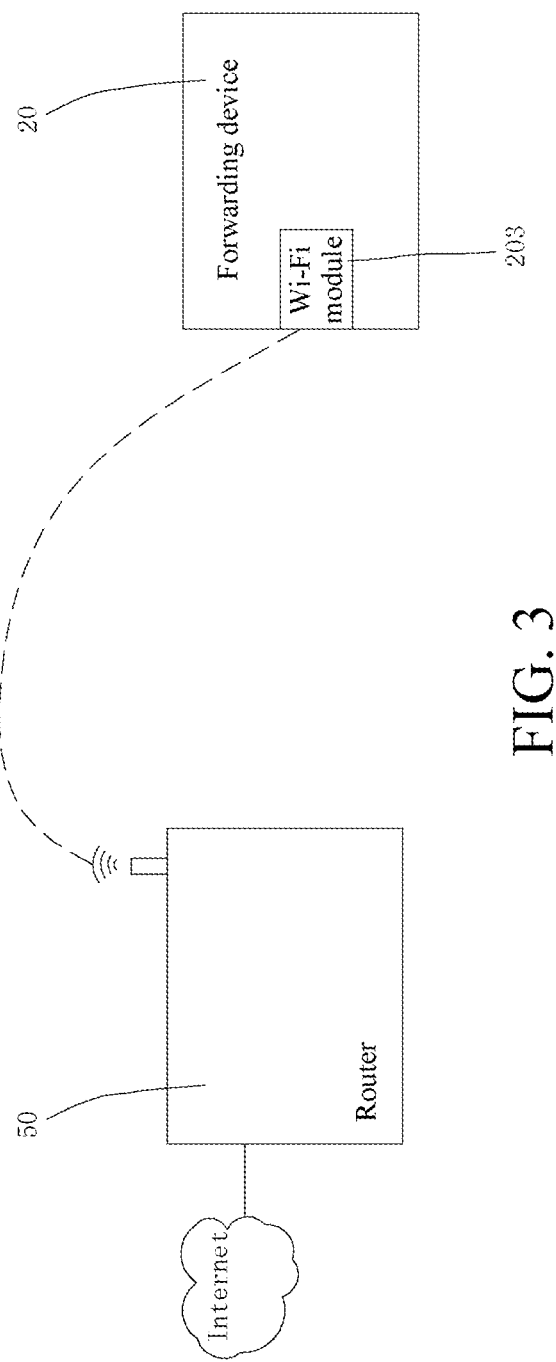
FIG. 3 is a schematic diagram showing that a forwarding device and a router are connected according to an embodiment of the present invention.
Figure 4:
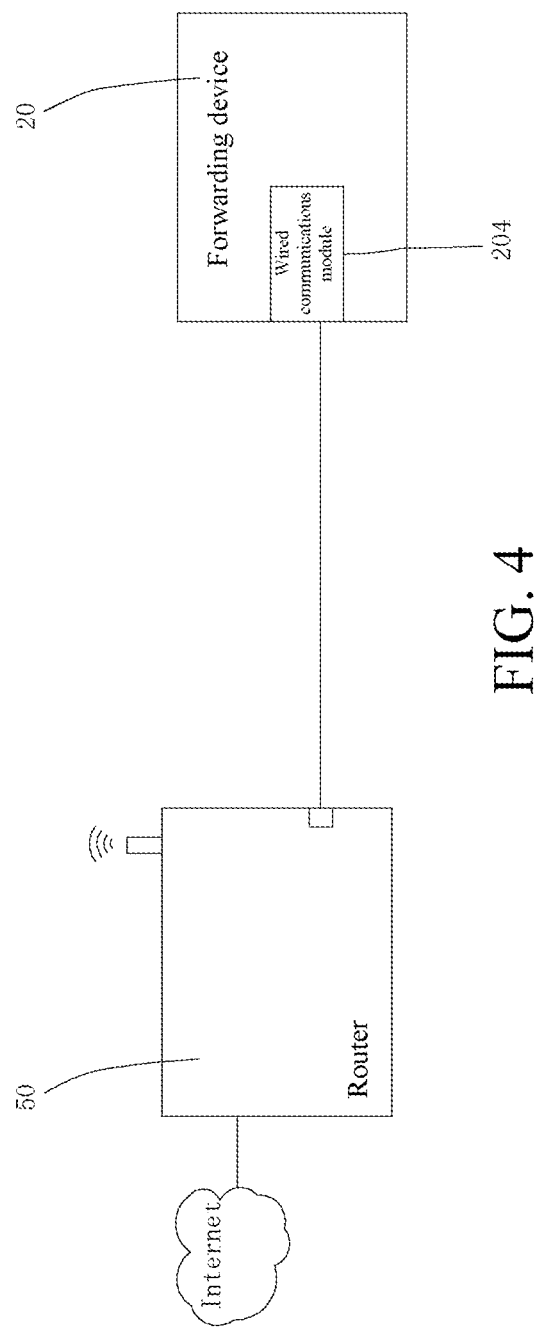
FIG. 4 is a schematic diagram showing that a forwarding device and a router are connected according to another embodiment of the present invention.
Figure 5:
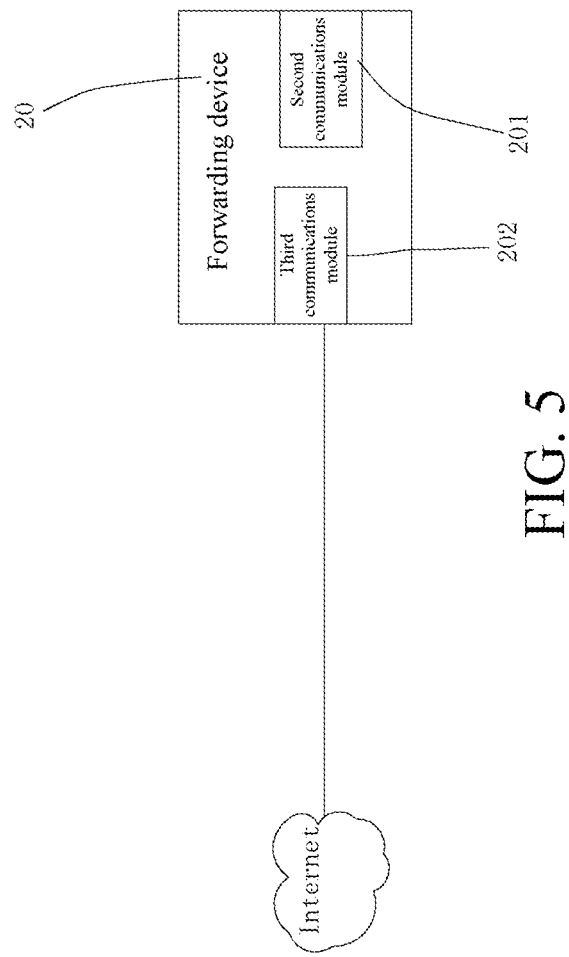
FIG. 5 is a schematic diagram showing that a forwarding device directly connects to the internet according to an embodiment of the present invention.

The forwarding device may be placed at any position in the working region. For example, the forwarding device is placed in a yard, is placed in a building such as a user's home, or may be alternatively integrated on a task execution device. With reference to FIG. 3, the forwarding device 20 is installed in the user's home. The forwarding device is connected to a gateway device such as a router 50 in the user's home to connect to the internet. In a specific embodiment, the third communications module includes a wireless communications module, for example, a Wi-Fi module 203. The forwarding device 20 uses the Wi-Fi module 203 to perform Wi-Fi communication with the router 50. Referring to FIG. 4 together, in another specific embodiment, the third communications module includes a wired communications module 204. The wired communications module 204 is connected to the router 50 through a networking cable to connect to the internet. It may be understood that referring to FIG. 5, the third communications module 202 of the forwarding device 20 may alternatively directly connect to the internet. For example, the forwarding device and the router 50 are integrated. That is, the forwarding device 20 is integrated with a routing function. In this case, the wired communications module 204 of the forwarding device 20 is connected to a network port through a networking cable to connect to the internet. Alternatively, the third communications module of the forwarding device 20 may include an independently running internet access module, for example, a cellular network module, and directly connects to the internet through the cellular network module.

In another specific embodiment, the forwarding device and the task execution device are integrated. For example, the forwarding device is integrated on a cleaning robot. The sensor device transmits the detected status information of the working region and each task execution device to the remote data processing center through the cleaning robot, or may further transmit the control information of the remote data processing center to each task execution device by using the cleaning robot. In this embodiment, one cleaning robot may be used to manage information of all the task execution devices in the working region. One machine serves many purposes, thereby making use of the user more convenient and a space for separately installing the forwarding device is saved.

In an embodiment of the present invention, the forwarding device and the sensor device may perform RF communication. Specifically, the sensor device includes a fourth communications module. The fourth communications module establishes a communication connection with the second communications module of the forwarding device to implement communication between the sensor device and the forwarding device. The fourth communications module is an RF communications module that operates in a frequency band below 1 GHz. In an embodiment, the frequency band of the RF communications module is a frequency band of 433 MHz, 868 MHz or 915 MHz. The forwarding device uses an RF communication manner in a frequency band below 1 GHz to acquire yard status information detected by the sensor device, so that communication is stable and reliable.

In another specific embodiment, the sensor device transmits the status information to the task execution device. The task execution device transmits the status information to the forwarding device. The sensor device may transmit the status information to the task execution device when the task execution device approaches the sensor device. It may be understood that the sensor device in the foregoing embodiment may also include a third frequency band switching module. The third frequency band switching module automatically switches the fourth communications module as required between a plurality of frequency bands. Eventually, the frequency band to which the fourth communications module is switched is the same as the frequency band of the forwarding device and/or the task execution device.

Figure 6:
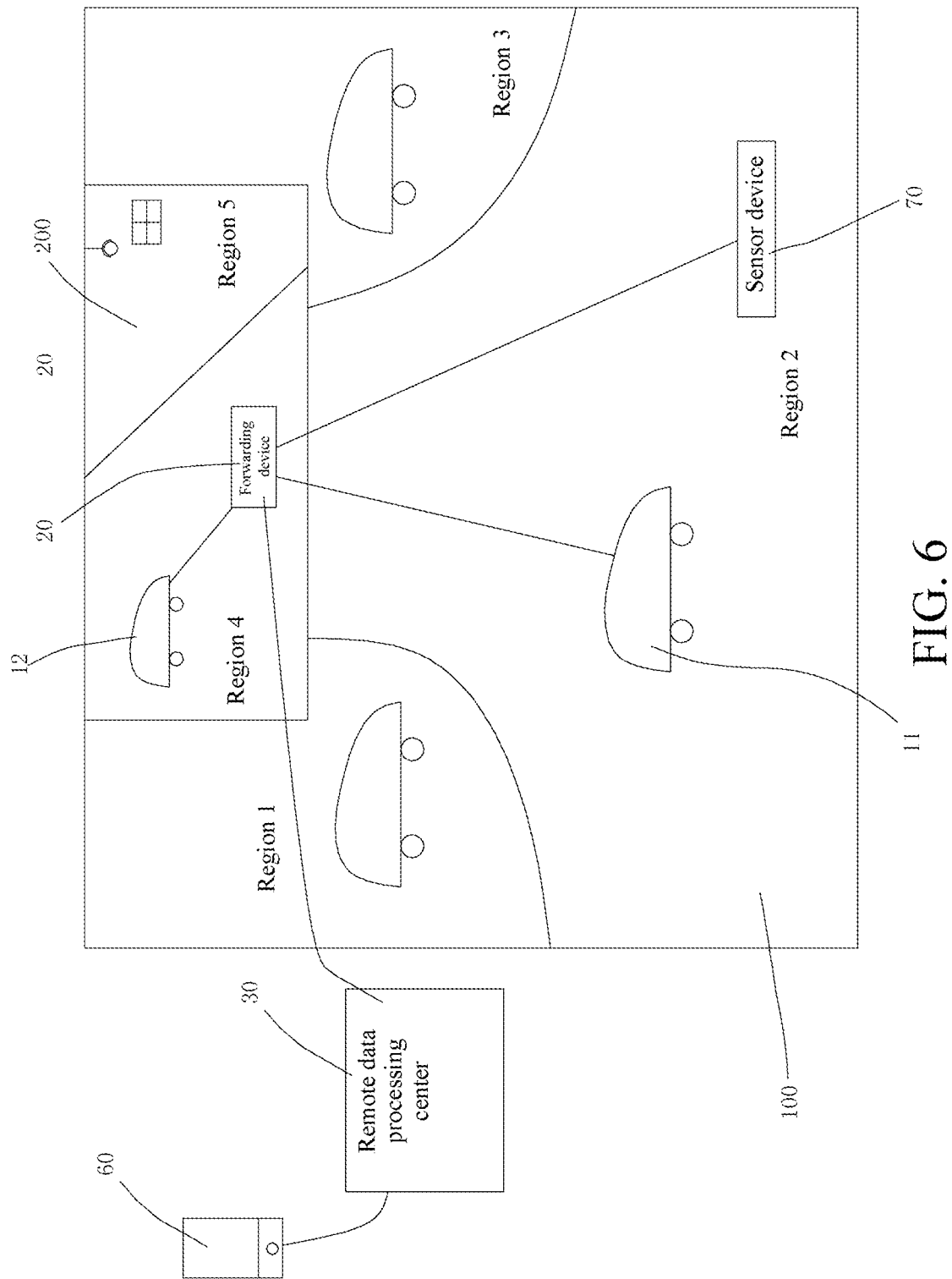
FIG. 6 is a schematic diagram of delimiting working regions by an automatic working system according to an embodiment of the present invention.

In the automatic working system shown in FIG. 6, the working region includes a user's yard and home. A yard 100 is divided into a region 1, a region 2, and a region 3. A home 200 is divided into a region 4 and a region 5. The forwarding device 20 is disposed in the user's home. The remote data processing center 30 is connected to the forwarding device 20. The intelligent terminal 60 is connected to the remote data processing center 30. The remote data processing center 30 stores map data of the working region. The working region includes at least two task execution devices. The forwarding device 20 communicates with the at least two task execution devices. A task execution device is parked in each region. An intelligent sprinkler that performs a sprinkling task is parked in the region 1. An intelligent lawn mower that performs a lawn mowing task is parked in the region 2. An intelligent cultivator that performs a cultivation task in the region 3. A cleaning robot that performs a floor cleaning task is parked in the region 4. A lamp and a door or window is installed in the region 5. A sensor device 70 is disposed in each region. The sensor device 70 in each region monitors a status of each region and a status of each task execution device, and transmits status information to the remote data processing center 30. In this embodiment, an intelligent lawn mower 11 performs a task in the region 2. The sensor device 70 monitors the height of grass on a lawn in the region 2, and transmits height data of the grass and status information of the intelligent lawn mower to the forwarding device 20 in an RF manner. The cleaning robot 12 performs a task in the region 4. The sensor device transmits dust data of the floor in the region 4 and the status information of the cleaning robot 12 to the forwarding device 20 in an RF manner. The forwarding device 20 transmits the dust data and the status information to the remote data processing center. The remote data processing center 30 stores preset conditions or preset algorithms, and compares the height data of the grass, the dust data of the floor, and the status information of the machine with the preset conditions separately to determine whether a the intelligent lawn mower 11 and the cleaning robot 12 need to be controlled to performs tasks. For example, when the height data of the grass is far greater than the preset height or the dust data of the floor is far greater than preset data, the remote data processing center performs processing to obtain control information. For example, the control information is to increase the cutting intensity of the intelligent lawn mower 11 and the cleaning intensity of the cleaning robot 12. The control information is transmitted to the forwarding device 20. The forwarding device 20 acquires the control information and then transmits the control information to the intelligent lawn mower 11 and the cleaning robot 12 to control the running of the intelligent lawn mower 11 and the cleaning robot 12. The forwarding device 20 is further connected to the intelligent terminal 60. The user can use the intelligent terminal 60 to acquire height information of the grass and dust information of the floor. The user may input an instruction as required on the intelligent terminal 60 to control the work of the intelligent lawn mower 11 and the cleaning robot 12. For example, if the height of the grass does not satisfy the preset condition, the user may still input an instruction on the intelligent terminal 60 to control the running of the intelligent lawn mower 11. In this embodiment, only the RF communications modules that operate in a frequency band below 1 GHz need to be used to implement communication between the forwarding device 20 and the intelligent lawn mower 11, the cleaning robot 12, and the sensor device 70. The communication protocol is relatively simple, the communications modules are connected fast, and the transmission is stable and reliable. The forwarding device communicates with an external network. In the automatic working system using this communication manner, stable communication is performed between all the devices in the working region and the forwarding device, thereby achieving high reliability and insusceptibility to the environment. It may be understood that, data signals transmitted between the forwarding device and the task execution device and/or sensor in this embodiment of the present invention are modulated and demodulated, so that data is transmitted more conveniently and signals are more stable.

In the automatic working system in this embodiment of the present invention, long distance transmission can be implemented between the forwarding device and the task execution device and/or the sensor device in an RF communication manner in a frequency band below 1 GHz, so that the running in a large-area working region can be managed. A transmission distance may be increased in one or more manners of increasing transmit powers of the forwarding device and the task execution device and/or sensor or reducing the frequency of data transmission or reducing an amount of data to be transmitted. If a transmit power is fixed, long distance transmission may be kept in a manner of reducing the transmission frequency or reducing the amount of data to be transmitted.

It can be understood that in a specific embodiment, the task execution devices can communicate with each other to transmit data. A communication manner is not limited, and in an embodiment, is RF communication, so that status data is transferred between the task execution devices. In a specific embodiment, the task execution devices may be electrically connected to supply power to each other.

In a specific embodiment, the forwarding device communicates with one task execution device at one time. That is, the forwarding device communicates with only one of an intelligent lawn mower, an intelligent sprinkling vehicle, an intelligent cultivator, and a cleaning robot at one time, so that the communication is more stable. After collecting status information of task execution devices and/or regions in different regions and communicating with the remote data processing center, the forwarding device can sequentially communicate with the task execution devices in different regions to control the work of the task execution devices in different regions.

In a specific embodiment, a forwarding device is further provided. The forwarding device is configured to communicate with the task execution device to manage the running of a task execution device, and may further acquire status information of the task execution device and a working region. The forwarding device includes a second communications module, and establishes a communication connection with at least one task execution device including a first communications module through the second communications module. The second communications module of the forwarding device is an RF communications module that operates in a frequency band below 1 GHz. The forwarding device includes a third communications module and can communicate with a remote data processing center. The forwarding device outputs the status information of the task execution device and the working region to the remote data processing center, may further acquire control information from the remote data processing center and manage the running of the task execution device based on the control information. The forwarding device can communicate with an intelligent terminal of a user and output a status information of the task execution device and the working region to be acquired by the user, and may further receive an instruction from the user. The forwarding device and the task execution device communicate with each other by using the RF communications modules that operate in a frequency band below 1 GHz. For example, an RF frequency band is a frequency band of 433 MHz, 868 MHz or 915 MHz. The forwarding device and the task execution device communicate with each other in an RF manner in a specific frequency band. It is simple to establish a communication connection, and data is stably transmitted. The forwarding device in this embodiment of the present invention has a small volume and may be placed at any position in a user's yard or home, so that no excessive space is wasted. In addition, the forwarding device further has advantages such as low costs, low power consumption, high sensitivity, a long transmission distance, and high efficiency.

In another specific embodiment, a task execution device is further provided. The task execution device performs a task in a working region. The task execution device includes a first communications module, communicates with a forwarding device including a second communications module through the first communications module, receives control information from the forwarding device, and transmits status information of task execution device and the working region to the forwarding device. The control information received by the task execution device is at least partially acquired by the forwarding device from a remote data processing center. The first communications module is an RF communications module that operates in a frequency band below 1 GHz. For example, an RF frequency band is a frequency band of 433 MHz, 868 MHz or 915 MHz. The task execution device and the forwarding device communicate with each other in an RF manner in a specific frequency band. It is simple to establish a communication connection, and data is stably transmitted.

The foregoing embodiments only describe several implementation manners of the present invention, and their description is specific and detailed, but cannot therefore be understood as a limitation to the patent scope of the present invention. It should be noted that a person of ordinary skill in the art may further make several variations and improvements without departing from the conception of the present invention, and these all fall within the protection scope of the present invention. Therefore, the patent protection scope of the present invention should be subject to the appended claims.

What is claimed is:

1. An automatic working system comprising:
   one or more processors;
   at least one task execution device; and
   at least one forwarding device,
   wherein:
   the at least one forwarding device communicates with the at least one task execution device;
   the at least one task execution device comprises a first communications module;
   the at least one forwarding device comprises a second communications module;
   the first communications module and the second communications module establish, based on instructions executedby the one or more processors, a communication connection to implement communication between the at least one task execution device and the at least one forwarding device;
   the first communications module and the second communications module are radio frequency (RF) communications modules that operate in a frequency band below 1 Gigahertz (GHz);
   the at least one forwarding device further comprises a third communications module, and is connected to a remote data processing center through the third communications module;
   the at least one forwarding device acquires, based on the instructions executed by the one or more processors, control information from the remote data processing center, and forwards the control information sent by the remote data processing center to the at least one task execution device to control a running of the at least one task execution device based on the control information;
   the at least one forwarding device outputs, based on the instructions executed by the one or more processors, status information of the at least one task execution device to the remote data processing center; and
   after the remote data processing center acquires the status information of the at least one task execution device including an intelligent lawn mower transmitted by the at least one forwarding device, the status information of the at least one task execution device is displayed on an intelligent terminal, and the automatic working system is further configured to receive an instruction from the intelligent terminal to control a running of the intelligent lawn mower.

2. The automatic working system according to claim 1, wherein:
   the control information acquired by the at least one forwarding device from the remote data processing center is at least partially generated by processing input information by the remote data processing center; and
   the input information comprises at least one piece of the status information of the at least one task execution device output by the at least one forwarding device, information input by a user or information automatically acquired by the remote data processing center from Internet.

3. The automatic working system according to claim 1, wherein the third communications module establishes a communication connection with a router, and connects to Internet through the router, so as to be connected to the remote data processing center.

4. The automatic working system according to claim 1, wherein the third communications module directly connects to Internet, so as to be connected to the remote data processing center.

5. The automatic working system according to claim 1, wherein the at least one forwarding device is connected to the remote data processing center to acquire an instruction from the intelligent terminal and/or output the status information of the at least one task execution device to the intelligent terminal.

6. The automatic working system according to claim 1, wherein the automatic working system comprises at least two task execution devices, and the at least one forwarding device communicates with the at least two task execution devices.

7. The automatic working system according to claim 1, wherein the at least one forwarding device communicates with one task execution device at one time.

8. The automatic working system according to claim 1, wherein the at least one forwarding device sequentially communicates with different task execution devices.

9. The automatic working system according to claim 1, wherein:
   the automatic working system comprises a sensor device that is configured to detect the status information of the at least one task execution device, and
   the at least one forwarding device collects the status information of the at least one task execution device detected by the sensor device.

10. The automatic working system according to claim 9, wherein:
    the sensor device comprises a fourth communications module;
    the fourth communications module establishes a communication connection with the second communications module of the at least one forwarding device to implement communication between the sensor device and the at least one forwarding device; and
    the fourth communications module is an RF communications module that operates in the frequency band below 1 GHz.

11. The automatic working system according to claim 9, wherein the sensor device is integrated into the at least one task execution device.

12. The automatic working system according to claim 1, wherein the at least one forwarding device is placed in a building, a yard, or integrated into the at least one task execution device.

13. The automatic working system according to claim 1, wherein the at least one forwarding device controls the at least one task execution device to start or end work, and/or sends parameters of the running of the at least one task execution device to the at least one task execution device, and/or controls a working path of the at least one task execution device.

14. The automatic working system according to claim 1, wherein the at least one task execution device comprises a self-moving device that is one of the intelligent lawn mower, an intelligent sprinkler, an intelligent snowplow, an intelligent cultivator, or a cleaning robot.

15. The automatic working system according to claim 1, wherein the automatic working system comprises at least two task execution devices, and the at least two task execution devices communicate with each other through the first communications module.

16. The automatic working system according to claim 1, wherein:
the at least one task execution device comprises a first frequency band switching module;
the at least one forwarding device comprises a second frequency band switching module;
the first frequency band switching module controls the first communications module to automatically switch between a first plurality of frequency bands; and
the second frequency band switching module controls the second communications module to automatically switch between a second plurality of frequency bands, to enable the first communications module and the second communications module to switch to a same frequency band.

17. A forwarding device comprising:
one or more processors, the forwarding device, based on instructions executed by the one or more processors, communicating with at least one task execution device comprising a first communications module;
a second communications module configured to communicate with the at least one task execution device comprising the first communications module through the second communications module, the second communications module of the forwarding device being a radio frequency (RF) communications module that operates in a frequency band below 1 Gigahertz (GHz); and
a third communications module configured to connect to a remote data processing center through the third communications module,
wherein:
the forwarding device acquires, based on the instructions executed by the one or more processors, control information from the remote data processing center, and forwards the control information sent by the remote data processing center to the at least one task execution device to control a running of the at least one task execution device based on the control information;
the forwarding device outputs, based on the instructions executed by the one or more processors, status information of the at least one task execution device to the remote data processing center; and
after the remote data processing center acquires the status information of the at least one task execution device including an intelligent lawn mower transmitted by the forwarding device, the status information of the at least one task execution device is displayed on an intelligent terminal, and the forwarding device is further configured to receive an instruction from the intelligent terminal and send the instruction to the intelligent lawn mower to control a running of the intelligent lawn mower.

18. The forwarding device according to claim 17, wherein the forwarding device is configured to communicate with at least two task execution devices and/or acquire status information of the at least two task execution devices.

19. The forwarding device according to claim 17, wherein the forwarding device comprises a second frequency band switching module, and the second frequency band switching module controls the second communications module to automatically switch between a plurality of frequency bands, to enable the second communications module and the first communications module to switch to a same frequency band.

20. The forwarding device according to claim 17, wherein the intelligent lawn mower is a self-moving device.

* * * * *